US008801522B2

(12) United States Patent
Guinn

(10) Patent No.: US 8,801,522 B2
(45) Date of Patent: Aug. 12, 2014

(54) USING BOTS IN A WAGERING GAME SYSTEM

(75) Inventor: Andrew C. Guinn, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 208 days.

(21) Appl. No.: 13/386,203

(22) PCT Filed: Jul. 20, 2010

(86) PCT No.: PCT/US2010/042668

§ 371 (c)(1),
(2), (4) Date: Jan. 20, 2012

(87) PCT Pub. No.: WO2011/011465

PCT Pub. Date: Jan. 27, 2011

(65) Prior Publication Data

US 2012/0123570 A1 May 17, 2012

Related U.S. Application Data

(60) Provisional application No. 61/227,224, filed on Jul. 21, 2009.

(51) Int. Cl.
*A63F 9/24* (2006.01)
*A63F 13/00* (2014.01)

(52) U.S. Cl.
USPC .................. 463/43; 463/11; 463/12; 463/13; 463/42

(58) Field of Classification Search
USPC ...................................................... 463/11–13
See application file for complete search history.

(56) References Cited

U.S. PATENT DOCUMENTS 7,604,541 B2 * 10/2009 Aikin et al. ..................... 463/42
2005/0043094 A1 2/2005 Nguyen et al.
2008/0026827 A1 1/2008 Skotarczak et al.
2009/0061974 A1 3/2009 Lutnick et al.
2010/0203938 A1 * 8/2010 Alderucci et al. .............. 463/11
2012/0077558 A1 * 3/2012 Alderucci et al. .............. 463/11

FOREIGN PATENT DOCUMENTS

WO WO2011011465 1/2011

OTHER PUBLICATIONS

"PokerRobot", source https://web.archive.org/web/20070101001614/http://www.pokerobot.com/ Published Jan. 1, 2007.*
"PCT Application No. PCT/US10/42668 International Preliminary Report on Patentability", Nov. 4, 2011 , 7 pages.

(Continued)

*Primary Examiner* — Steven J Hylinski
(74) *Attorney, Agent, or Firm* — DeLizio Gilliam, PLLC

(57) ABSTRACT

A wagering game system and its operations are described herein. In some embodiments, the operations can include generating game history for each of a plurality of wagering games, associated with a first wagering game title, played by a first player via a wagering game system. The operations can also include randomly selecting, from the game history, a subset of the plurality of wagering games previously played by the first player, and generating a computer bot for the first player, based on the subset of the plurality of wagering games, to be used during a multiplayer wagering game competition to play for the first player. The operations can further include initiating, via the wagering game system, the multiplayer wagering game competition, replaying, during the multi-player wagering game competition, the subset of the plurality of wagering games using the computer bot, and determining results of the multiplayer wagering game competition.

17 Claims, 7 Drawing Sheets

(56) References Cited

OTHER PUBLICATIONS

"PCT Application No. PCT/US10/42668 International Search Report", Sep. 14, 2010 , 10 pages.

Watson, Ian et al., "Improving a Case-Based Texas Hold'em Poker Bot", *2008 IEEE Symposium on Computational Intelligence and Games* 2008 , 350-356.

* cited by examiner

USING BOTS IN A WAGERING GAME SYSTEM

RELATED APPLICATIONS

This application claims the priority benefit of U.S. Provisional Application Ser. No. 61/227,224 filed Jul. 21, 2009.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to wagering game systems, and more particularly to using computer bots and game history in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Traditionally, wagering game machines have been confined to physical buildings, like casinos (e.g., major casinos, road-side casinos, etc.). The casinos are located in specific geographic locations that are authorized to present wagering games to casino patrons. However, with the proliferation of interest and use of the Internet, some wagering game manufacturers have recognized that a global public network, such as the Internet, can reach to various locations of the world that have been authorized to present wagering games. Consequently, some wagering game manufacturers have created wagering games that can be processed by personal computing devices and offered via online casino websites ("online casinos").

SUMMARY

In some embodiments, a computer-implemented method comprises: generating game history for each of a plurality of wagering games, associated with a first wagering game title, played by a first player via a wagering game system; randomly selecting, from the game history associated with the first player, a subset of the plurality of wagering games previously played by the first player; generating a computer bot for the first player, based on the subset of the plurality of wagering games previously played by the player, to be used during a multiplayer wagering game competition to play for the first player; initiating, via the wagering game system, the multiplayer wagering game competition between a plurality of players including the computer bot playing for the first player; replaying, during the multiplayer wagering game competition, the subset of the plurality of wagering games using the computer bot; and determining results of the multiplayer wagering game competition.

In some embodiments, the method further comprises determining a number of wagering games, of the first wagering game title, that are expected to be played during the multiplayer wagering game competition.

In some embodiments, the method further comprises randomly selecting, from the game history associated with the first player, a subset of the plurality of games previously played by the first player based on the number of games that are expected to be played during the multiplayer wagering game competition.

In some embodiments, the method further comprises identifying eligibility requirements for the multiplayer wagering game competition, and determining whether the first player meets the eligibility requirements.

In some embodiments, the eligibility requirements include at least a minimum number of wagering games previously played of the first wagering game title.

In some embodiments, said generating the computer bot based on the subset of the plurality of wagering games previously played by the player comprises customizing the computer bot to replay the subset of the plurality of wagering games based on game events stored in the first player's game history for the subset of the plurality of wagering games.

In some embodiments, said replaying, during the multiplayer wagering game competition, the subset of the plurality of wagering games comprises: replaying, during the multiplayer wagering game competition, the subset of the plurality of wagering games using the computer bot based on game events stored in the first player's game history for the subset of the plurality of wagering games while the first player is unavailable.

In some embodiments, said replaying, during the multiplayer wagering game competition, the subset of the plurality of wagering games comprises: generating results, during the wagering game competition, for the first player using the computer bot, wherein the results generated using the computer bot correspond to the results associated with the subset of the plurality of wagering games that are randomly selected from the first player's game history.

In some embodiments, said determining results of the multiplayer wagering game competition comprises determining that the computer bot playing for the first player has won an award, and providing at least a portion of the award to the first player.

In some embodiments, the wagering game system comprises an online wagering game system.

In some embodiments, the wagering game system comprises a casino floor wagering game system.

In some embodiments, the first wagering game title is one of a blackjack game, a poker game, a roulette game, or a Texas hold'em game.

In some embodiments, said generating game history for each of the plurality of wagering games associated with the first wagering game title comprises: detecting game events associated with a wagering game of the wagering game title;

generating game history data based on the game events detected for the wagering game; and storing the game history data in a game history unit.

In some embodiments, the method further comprises receiving, from a gaming machine via a communications network, a request to access the first player's game history; providing access to the first player's game history via the gaming machine; receiving input, from the first player via the gaming machine, specifying which wagering games out of the plurality of games in the first player's game history to consider when randomly selecting the subset of wagering games for the multiplayer wagering game competition.

In some embodiments, a wagering game server comprises: a game history unit configured to generate game history for each of a plurality of wagering games associated with a first wagering game title, played by a first player via a wagering game system; a wagering game management unit configured to randomly select, from the game history associated with the first player, a subset of the plurality of wagering games previously played by the first player and configured to: generate a computer bot for the first player, based on the subset of the plurality of wagering games previously played by the player, to be used to generate results associated with the subset of the plurality of wagering games during a multiplayer wagering game competition for the first player; initiate the multiplayer wagering game competition between a plurality of players including the computer bot participating for the first player and one or more additional players; generate results, during the wagering game competition, for the first player using the computer bot, wherein the results generated using the computer bot correspond to the results associated with the subset of the plurality of wagering games that are randomly selected from the first player's game history; generate results, during the wagering game competition, for the one or more additional players; and determine overall results of the multiplayer wagering game competition based on the results generated for the first player and the results generated for the one or more additional players.

In some embodiments, the wagering game management unit is configured to generate the results for the one or more additional players based on game events generated during the multiplayer wagering game competition.

In some embodiments, the wagering game management unit is configured to compare the results generated for the first player and the results generated for the one or more additional players to determine the overall results of the multiplayer wagering game competition.

In some embodiments, a wagering game server comprises means for generating game history for each of a plurality of wagering games, associated with a first wagering game title, played by a first player via a wagering game system; means for determining a number of wagering games, of the first wagering game title, that are expected to be played during a multiplayer wagering game competition; means for randomly selecting, from the game history associated with the first player, a subset of the plurality of wagering games previously played by the first player based on the number of wagering games expected to be played during the multiplayer wagering game competition; means for generating a computer bot for the first player, based on the subset of the plurality of wagering games previously played by the player, to be used during the multiplayer wagering game competition to play for the first player; means for initiating, via the wagering game system, the multiplayer wagering game competition between a plurality of players including the computer bot playing for the first player; means for replaying, during the multiplayer wagering game competition, the subset of the plurality of wagering games using the computer bot; and means for determining results of the multiplayer wagering game competition.

In some embodiments, the wagering game server further comprises means for identifying eligibility requirements for the multiplayer wagering game competition, and means for determining whether the first player meets the eligibility requirements.

In some embodiments, said means for generating a computer bot for the first player further comprises means for customizing the computer bot to replay the subset of the plurality of wagering games based on game events stored in the first player's game history for the subset of the plurality of wagering games.

In some embodiments, a computer-implemented method comprises: generating game history for a plurality of professional players, wherein the game history of the professional players includes a plurality of wagering games, associated with a first wagering game title, played by the professional players via a wagering game system; receiving, from a gaming machine, a selection of one or more of the plurality of professional players entered by a first player at the gaming machine to participate in a professional bot wagering game competition; randomly selecting, from the game history of each of the selected professional players, a subset of the plurality of wagering games previously played by each of the selected professional players to be used during the professional bot wagering game competition; generating a computer bot for each of the selected professional players, based on the subset of the plurality of wagering games previously played by each of the selected professional players, to be used during the professional bot wagering game competition to play for the first player; initiating, via the wagering game system, the professional bot wagering game competition between a plurality of players including one or more computer bots playing for the first player and one or more computer bots playing for one or more additional players; replaying, during the professional bot wagering game competition, the subset of the plurality of wagering games previously played by each of the selected professional players using the one or more computer bots associated with the first player; and determining results of the professional bot wagering game competition.

In some embodiments, said replaying, during the professional bot wagering game competition, the subset of the plurality of wagering games previously played by each of the selected professional players comprises: replaying, during the professional bot wagering game competition, the subset of the plurality of wagering games previously played by each of the selected professional players using the one or more computer bots associated with the first player based on game events stored in the game history of each of the selected professional players.

In some embodiments, said determining results of the professional bot wagering game competition comprises: determining that one of a plurality of computer bots associated with the first player has won an award, and providing a portion of the award to the first player and providing a remaining portion of the award to a corresponding professional player.

In some embodiments, one or more machine-readable media, having instructions stored therein, which, when executed by a set of one or more processors causes the set of one or more processors to perform operations that comprise: generating game history for each of a plurality of wagering games, associated with a first wagering game title, played by a first player via a wagering game system; randomly selecting, from the game history associated with the first player, a subset of the plurality of wagering games previously played by the first player; generating a computer bot for the first player, based on the subset of the plurality of wagering games previously played by the player, to be used during a multiplayer wagering game competition to play for the first player; initiating, via the wagering game system, the multiplayer wagering game competition between a plurality of players including the computer bot playing for the first player; replaying, during the multiplayer wagering game competition, the subset of the plurality of wagering games using the computer bot; and determining results of the multiplayer wagering game competition.

In some embodiments, the operations further comprise determining a number of wagering games, of the first wagering game title, that are expected to be played during the multiplayer wagering game competition, and randomly selecting, from the game history associated with the first player, the subset of the plurality of games previously played by the first player based on the number of games that are expected to be played during the multiplayer wagering game competition.

BRIEF DESCRIPTION OF THE FIGURES

Embodiments are illustrated in the Figures of the accompanying drawings in which.

DESCRIPTION OF THE EMBODIMENTS

This description of the embodiments is divided into five sections. The first section provides an introduction to some embodiments, while the second section describes example wagering game system architectures. The third section describes example operations performed by some embodiments and the fourth section describes example wagering game machines in more detail. The fifth section presents some general comments.

Introduction

This section provides an introduction to some embodiments.

Wagering game systems offer wagering game players ("players") entertainment value and the opportunity to win monetary value. In various embodiments, wagering game systems can try to enhance the gaming experience by offering players the option to use computer bots for multiplayer wagering game competitions, such as wagering game tournaments (e.g., video slots or video poker tournaments), head-to-head competitions between two players, among others. In some instances, computer bots run automatically, in computer systems, to perform one or more functions or tasks. In some implementations, a computer bot and a player's game history can be used in the wagering game system to play one or more multiplayer wagering game competitions for the player, while the player is away from the wagering machine or otherwise unavailable. In one example, the wagering game system can randomly select a plurality of wagering games previously played by the player of a specific wagering game title (e.g., Zeus slot game) from a player's game history, and generate a computer bot that is programmed to replay the previously played wagering games during a multiplayer wagering game competition, as will be further described below with reference to FIGS. 1-4. By using a subset of the player's game history to play the multiplayer wagering game competition, the computer bot can implement the player's previously exhibited style of play during the competition. In other implementations, the wagering game system can generate computer bots for professional wagering game players, or other celebrities, based on their game history. In these implementations, the wagering game system may allow players to select one or more computer bots of professional wagering game players and participate in bot tournaments using the professionals' computer bots, as will be further described below in FIGS. 5-6. It is noted that additional examples of using computer bots and game history will be described below. It is further noted that the mechanism and techniques described herein for using computer bots and game history can be implemented in both online wagering game systems and casino floor wagering game systems.

Figure 1:
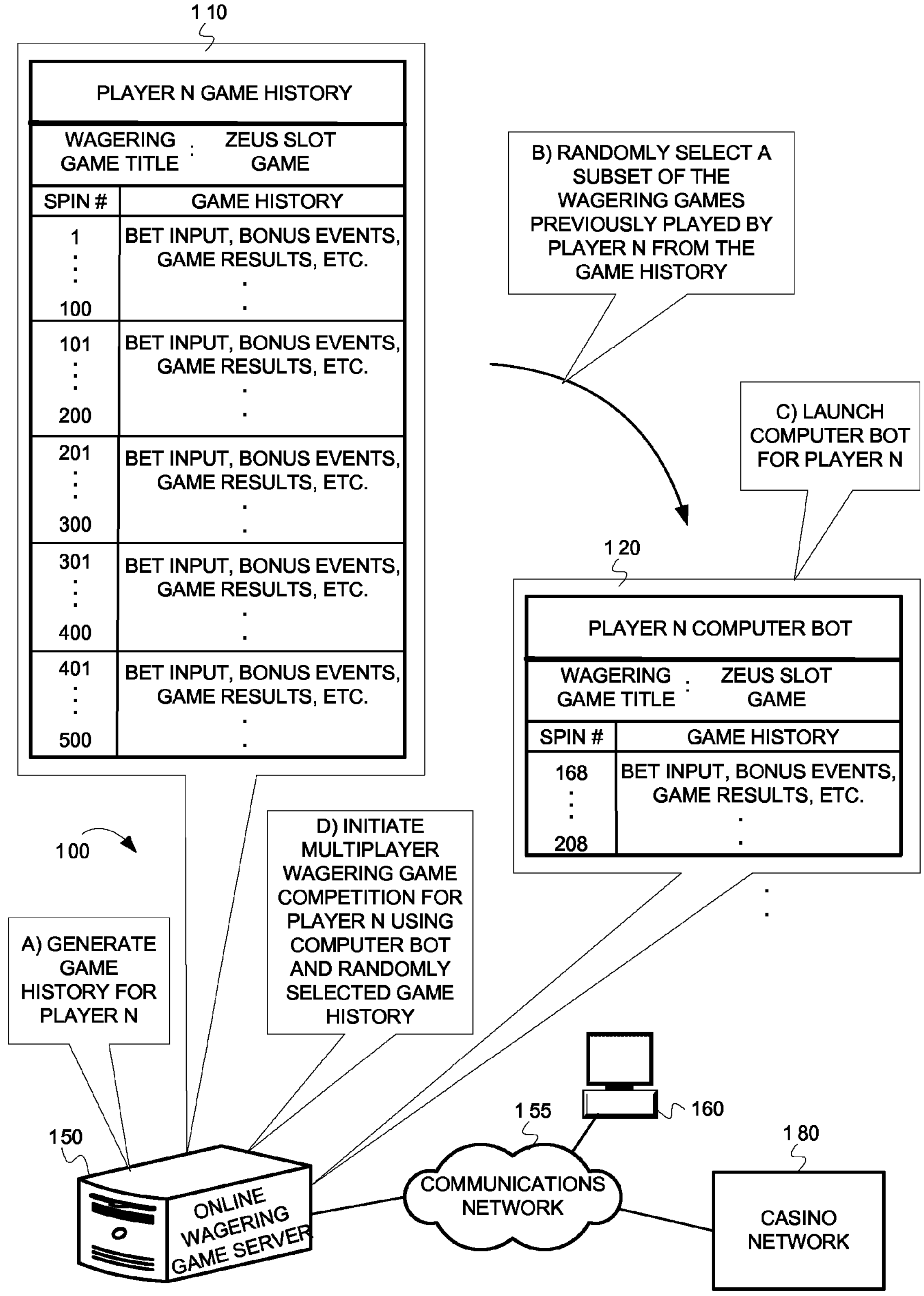
FIG. 1 is a conceptual diagram illustrating an example of using a computer bot and a player's game history in a wagering game system, according to some embodiments.

FIG. 1 is a conceptual diagram illustrating an example of using a computer bot and a player's game history in a wagering game system, according to some embodiments. In the example shown in FIG. 1, the wagering game system ("system") 100 includes an online wagering game server 150 connected to an online wagering game machine ("gaming machine") 160 via a communications network 155. In some embodiments, the online wagering game server 150 can also connect to a casino network 180, including one or more casino network devices, such as wagering game servers, account servers, wagering game machines, or other devices (not shown).

In one implementation, at stage A, the online wagering game server 150 generates game history for a player, e.g., player N. The game history can include game events associated with wagering games played by the player, e.g., button presses, bet inputs, bonus events, credit balances, random numbers, intermediate game results, final game results, etc., which can be used to reproduce and replay the wagering games previously played by the player. In one example, the online wagering game server 150 can generate game history 110 for the player N with respect to the wagering games played of a specific wagering game title, e.g., the spins of a "Zeus" slot game. As illustrated, in one example, the game history 110 may include game history entries for 500 spins (games) the player N played of the Zeus slot game.

At stage B, the online wagering game server 150 randomly selects a subset of the wagering games previously played by the player N from the game history 110. In one example, the online wagering game server 150 can randomly select a block of spins from the game history 110, e.g., spins #168-208. In another example, after determining the number of spins to select, e.g., 40 spins, the online wagering game server 150 can randomly select any of the 500 spins in the game history for a total of 40 spins, rather than selecting a block of spins from back-to-back game history entries.

At stage C, the online wagering game server 150 launches a computer bot 120 for player N. The computer bot 120 is designed to replay the randomly selected game history associated with the player N. In one implementation, the online wagering game server 150 can use the computer bot and randomly selected game history to automatically play a multiplayer wagering game competition for the player N, e.g., when the player is offline or otherwise unavailable.

At stage D, the online wagering game server 150 initiates the multiplayer wagering game competition for player N using the computer bot and the randomly selected game history associated with player N. In one implementation, during the multiplayer wagering game competition, the online wagering game server 150 uses the computer bot to replay the randomly selected games previously played by the player N, as will be further described below with reference to FIGS. 3-4. In one example, the multiplayer wagering game competition is a Zeus-themed online slot tournament. In another example, the multiplayer wagering game competition is a head-to-head Zeus online slot competition, which is triggered after a player M challenges player N's computer bot. In one scenario, player M may challenge player N's computer bot in an attempt to overtake player N in a leader board of the Zeus slot game. It is noted, however, that the online wagering game server 150 can use computer bots and game history for various other game examples and implementations, as will be further described below.

It is further noted that in other implementations, similar to the online example described above, a wagering game server in the casino network 180 can be configured to generate a computer bot and randomly select game history of a player, and then use the computer bot and the selected game history to play a multiplayer wagering game competition for the player while the player is unavailable.

Although FIG. 1 describes some embodiments, the following sections describe many other features and embodiments.

Operating Environment

This section describes example operating environments and networks and presents structural aspects of some embodiments. More specifically, this section includes discussion about wagering game system architectures.

Wagering Game System Architectures

Figure 2:
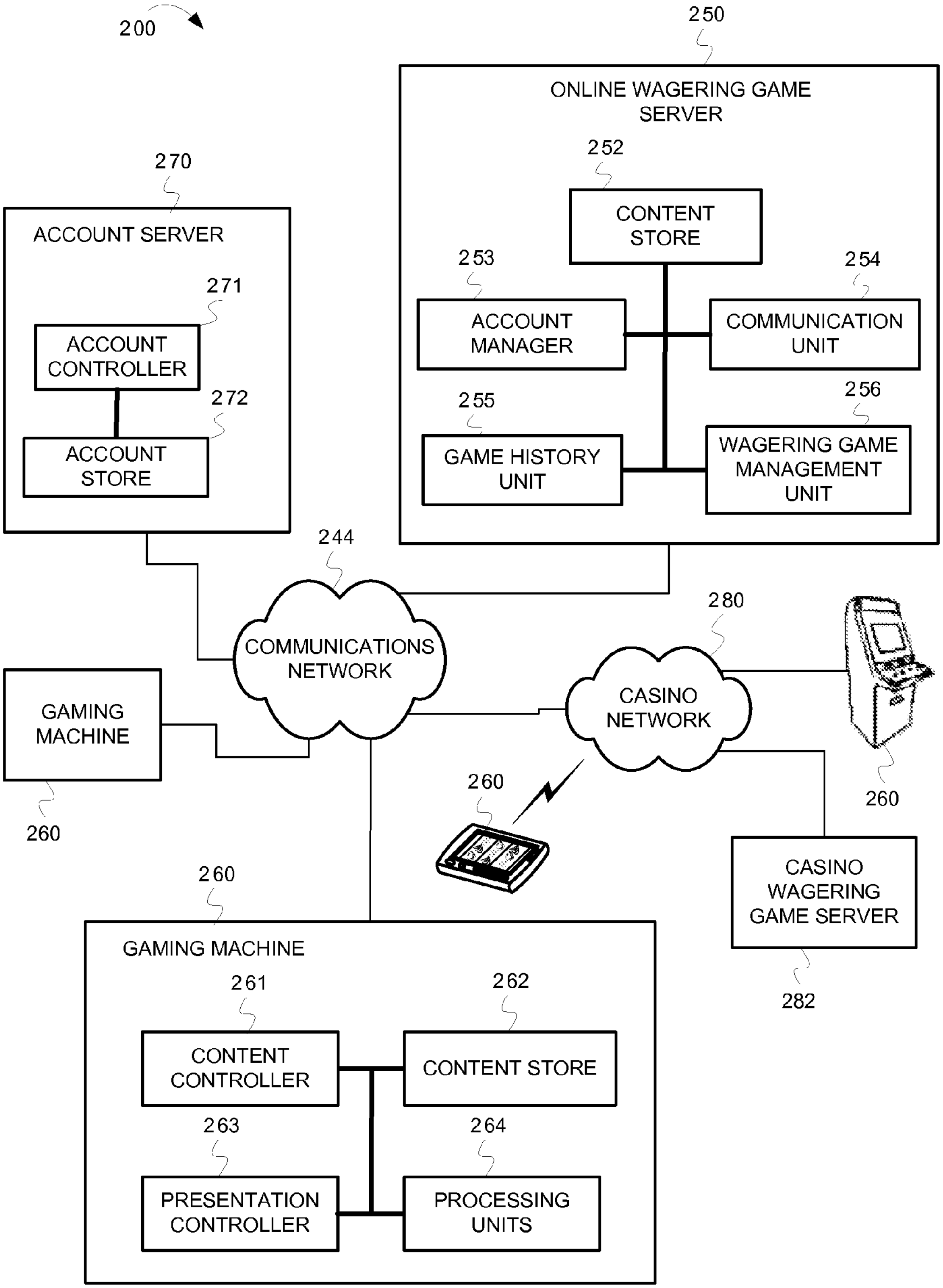
FIG. 2 is a conceptual diagram that illustrates an example of a wagering game system architecture, according to some embodiments.

FIG. 2 is a conceptual diagram that illustrates an example of a wagering game system architecture 200, according to some embodiments. The wagering game system architecture 200 can include an account server 270 configured to control player-related accounts accessible via wagering game networks. The account server 270 can manage player financial accounts (e.g., performing funds transfers, deposits, withdrawals, etc.) and player information (e.g., avatars, screen name, account identification numbers, social contacts, financial information, etc.). The account server 270 can also provide auditing capabilities, according to regulatory rules, and track the performance of players, machines, and servers. The account server 270 can include an account controller 271 configured to control information for player accounts. The account server 270 can also include an account store 272 configured to store information for player accounts.

The wagering game system architecture 200 can include an online wagering game server 250 configured to control online wagering game content, provide wagering game results (e.g., random numbers), and communicate wagering game information, account information, and other information to and from a gaming machine 260. The online wagering game server 250 can include a content store 252 containing content for presenting game results and other events on the gaming machine 260. The online wagering game server 250 can also include an account manager 253 configured to control information related to player accounts. For example, the account manager 253 can provide wager amounts, game results amounts (e.g., win amounts), bonus game amounts, etc., to the account server 270. The online wagering game server 250 can also include a communication unit 254 configured to communicate information from the server's components to the gaming machine 260, other systems, devices, and networks (e.g., the casino network 280). For example, the communication unit 254 can exchange information with community wagering game servers, account servers, community servers, social networking servers, file sharing servers, etc.

The online wagering game server 250 further includes a game history unit 255 configured to store game history associated with games previously played by players. The game history can include game events, e.g., button presses, bet inputs, bonus events, credit balances, random numbers, intermediate game results, final game results, etc., which can be used to reproduce and replay the games previously played by the player. In some embodiments, the game history unit 255 can store game history associated with online games played by players. In some embodiments, the game history unit 255 can communicate with the casino wagering game server 282 of casino network 280 to obtain game history associated with games played by players in the casino floor, in addition to the game history associated with the online games.

The online wagering game server 250 further includes a wagering game management unit 256 configured to facilitate presentation of wagering games on the gaming machine 260. For example, the wagering game management unit 256 can generate and provide game results to the gaming machine 260 for presentation on a display device of the gaming machine 260. The wagering game management unit 256 can also generate random numbers and provide them to the gaming machine 260 so that the gaming machine 260 can generate game results. In some embodiments, the wagering game management unit 256 can randomly select game history of a player and generate a computer bot to play a multiplayer wagering game competition for the player while the player is unavailable, as described further below with reference to FIG. 3-6.

The wagering game system architecture 200 can include a plurality of gaming machines 260 configured to communicate with the online wagering game server 250 to control and present online wagering games. For example, each game machine 260 can present online wagering games on a display device (e.g., screen, monitor, etc.) of the game machine 260. The gaming machines 260 can be various types of systems, e.g., a personal computer (PC), a mobile device, a laptop computer, a netbook, etc. Each gaming machine 260 can include a content controller 261 configured to manage and control content and presentation of the online wagering games on the gaming machine 260. Each gaming device 260 can also include a content store 262 configured to store content to present on the gaming machine 260. Each gaming device 260 may further include a presentation controller 263 configured to control the presentation of the online wagering games on the gaming machine 260. The presentation controller 263 can include a web browser, browser plug-ins, and any other software and/or hardware suitable for presenting audio and video content. In some embodiments, the presentation controller 263 presents game results using content stored locally in the content store 262. However, in some instances the presentation controller 263 may receive, from the server 250, content for presenting game results, or the controller 263 may request particular content from other network devices. The gaming machine 260 can also include processing components 264 (e.g., microprocessor, memory, bus, etc.) configured to operate in concert with the gaming machine's other components.

The wagering game system architecture 200 can also include a casino network 280 comprising a casino wagering game server 282 and a plurality of gaming machines 260, e.g., wired and/or wireless casino floor wagering game machines. Similar to the online wagering game server 250, the casino wagering game server 282 can include a content store, an account manager, a communication unit, a wagering game management unit, and a game history unit to control wagering game content, provide wagering game results, communicate wagering game information, account information, and other information to and from the one or more casino floor gaming machines 260. The game history unit of the casino wagering game server 282 can generate game history for casino floor players. Similar to the online implementation, the wagering game management unit of the casino wagering game server 282 can use computer bots and game history to play multiplayer wagering game competitions for casino floor players while the players are unavailable.

Each component shown in the wagering game system architecture 200 is shown as a separate and distinct element connected via the communications network 244. However, some functions performed by one component could be performed by other components. For example, the online wagering game server 250 can also be configured to perform functions of the account server 270. Furthermore, the components shown may all be contained in one device, but some, or all, may be included in, or performed by multiple devices, as in the configurations shown in FIG. 2 or other configurations not shown. Furthermore, the wagering game system architecture 200 can be implemented as software, hardware, any combination thereof, or other forms of embodiments not listed. For example, any of the network components (e.g., the wagering game machines, servers, etc.) can include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Operations

This section describes operations associated with some embodiments. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
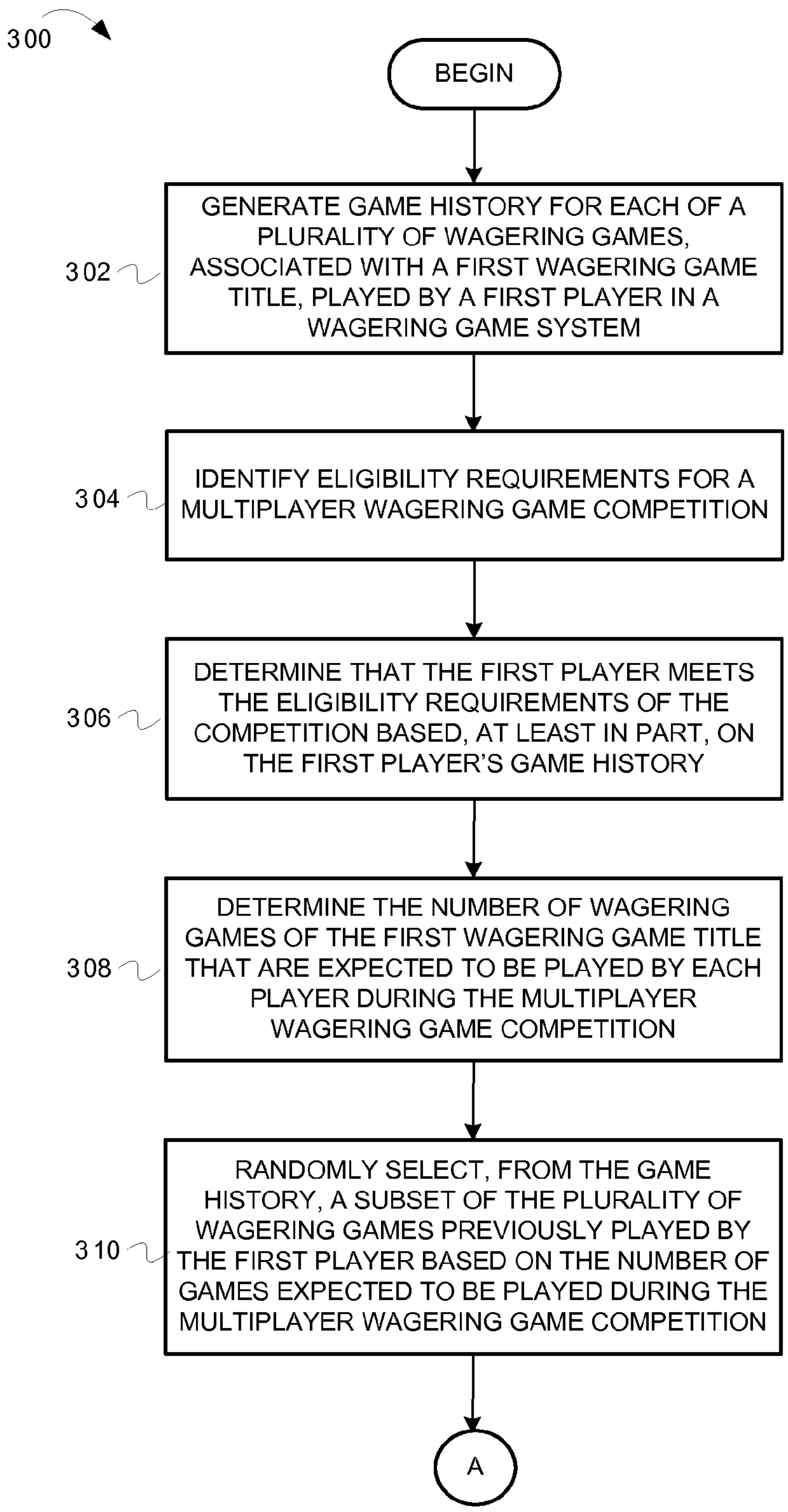
FIG. 3 is a flow diagram ("flow") 300 illustrating operations for using a computer bot and a player's game history to play a multiplayer wagering game competition for a player in a wagering game system, according to some embodiments.
Figure 4:
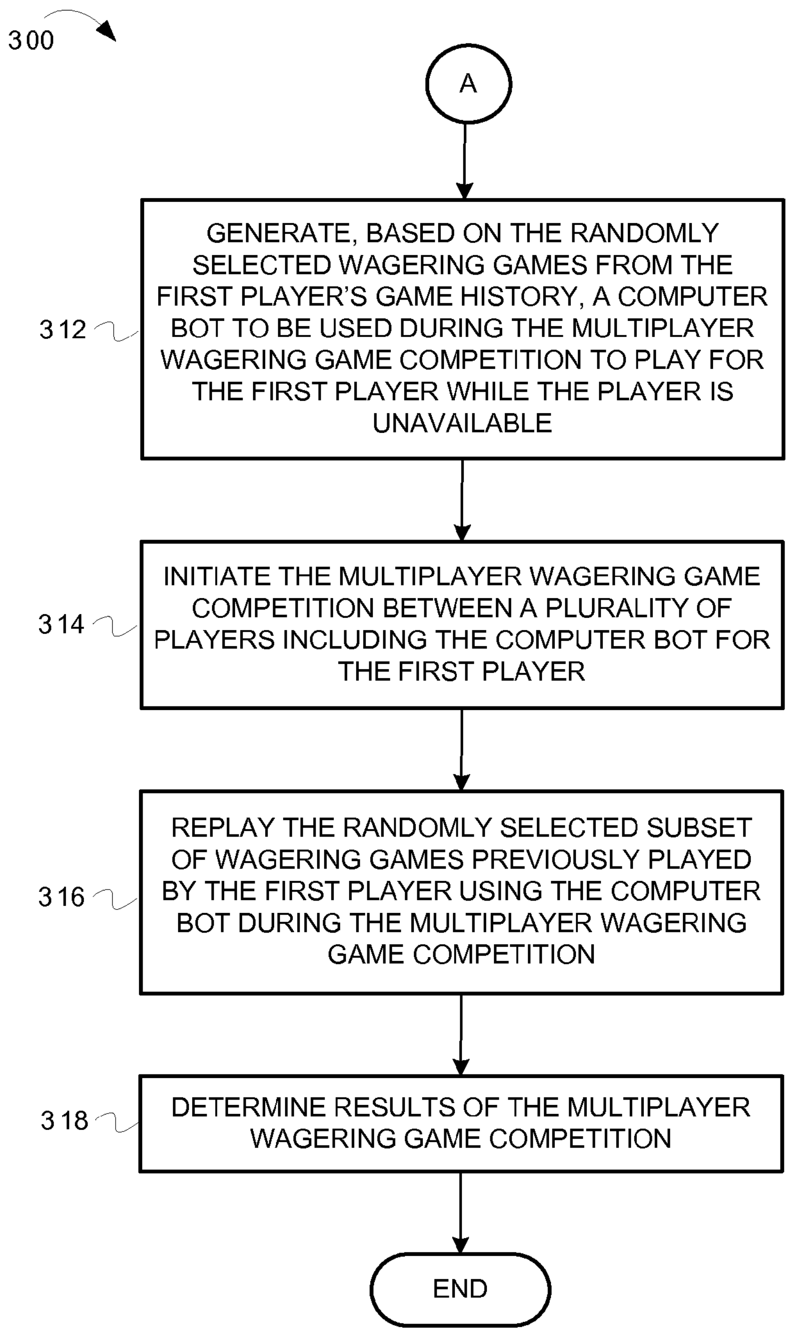
FIG. 4 is a continuation of the flow diagram 300 illustrating operations for using a computer bot and a player's game history to play a multiplayer wagering game competition for a player in a wagering game system, according to some embodiments.
Figure 5:
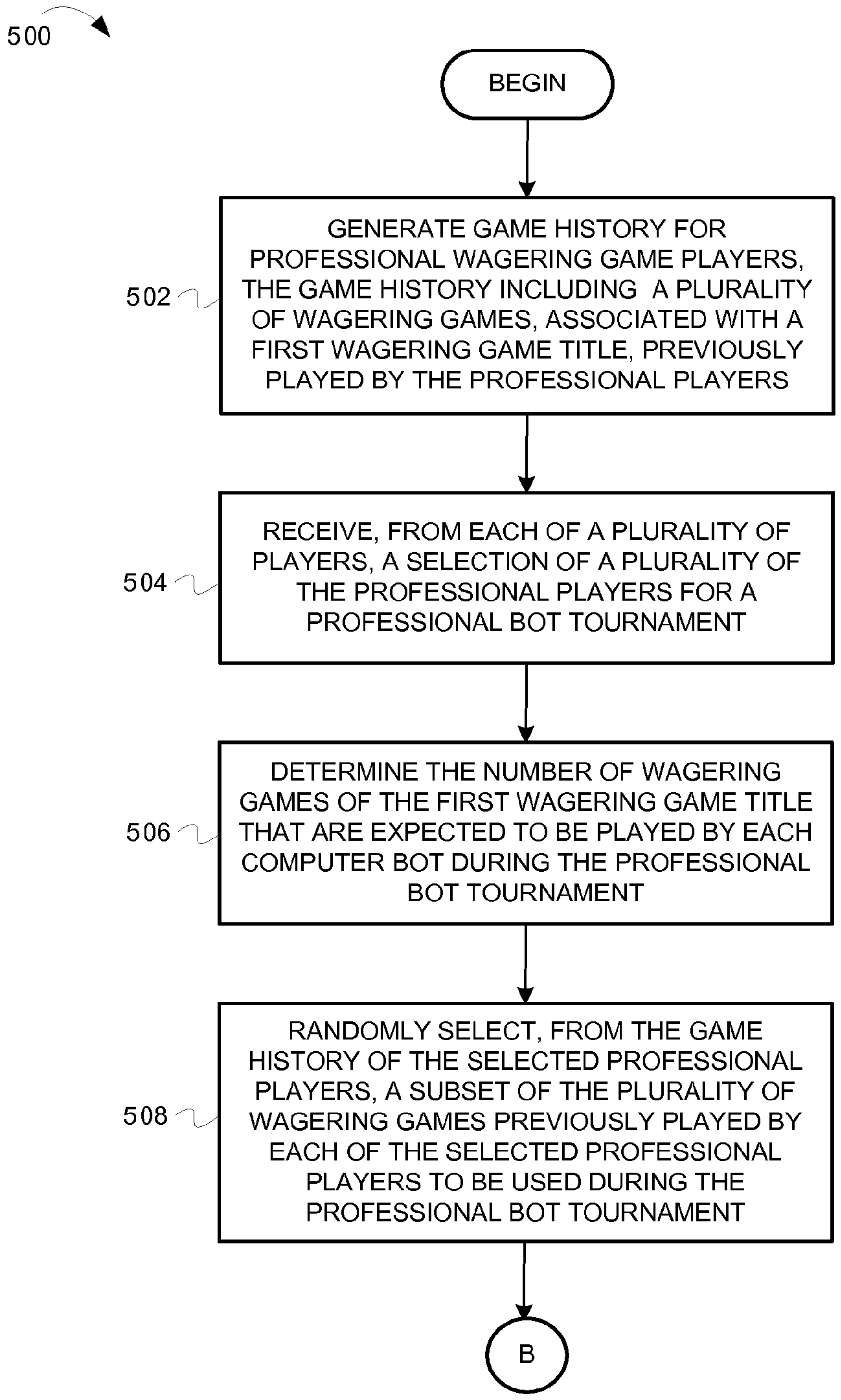
FIG. 5 is a flow diagram ("flow") 500 illustrating operations for using a computer bot and a professional wagering game player's game history to implement a professional bot tournament in a wagering game system, according to some embodiments.
Figure 6:
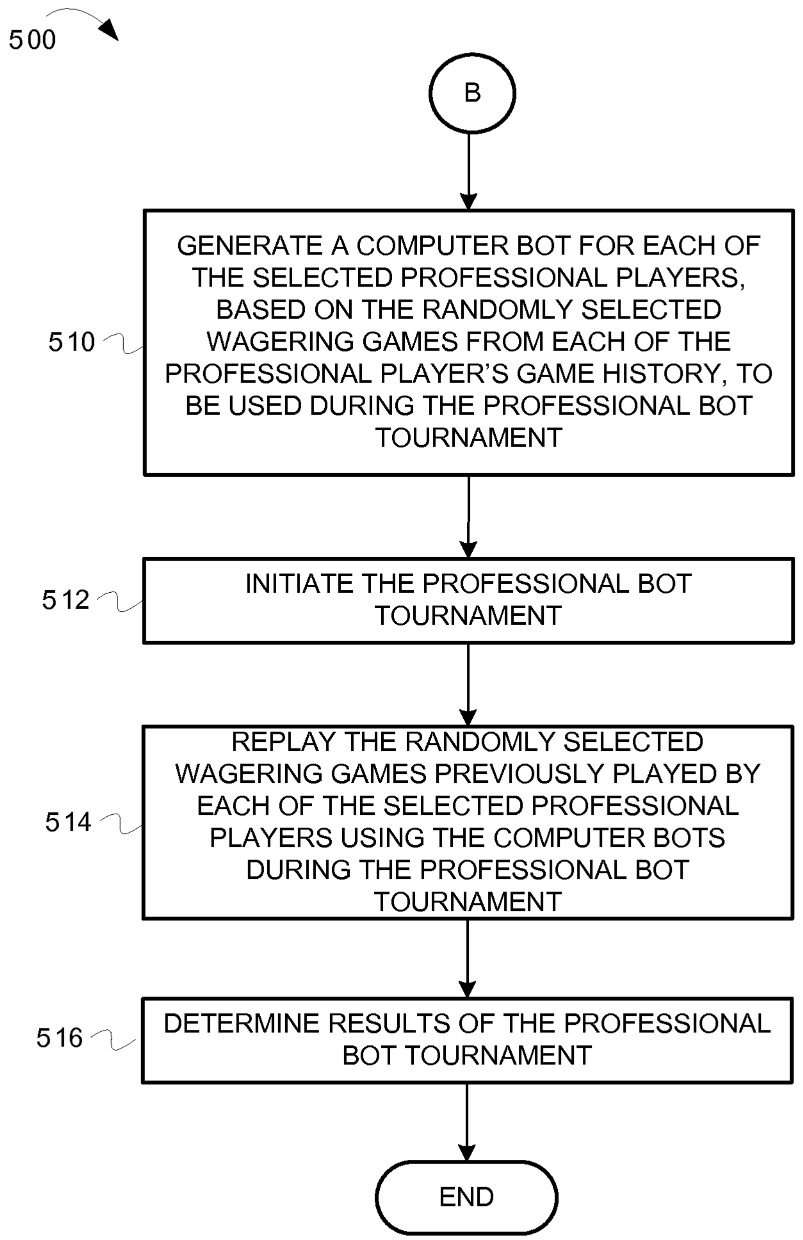
FIG. 6 is a continuation of the flow diagram 500 illustrating operations for using a computer bot and a professional wagering game player's game history to implement a professional bot tournament in a wagering game system, according to some embodiments.

The following discussion of FIGS. 3-4 describes example mechanisms for using a computer bot and a player's game history in a wagering game system. FIG. 5-6 describes an example mechanism for using a computer bot and a professional player's game history to implement a professional bot tournament in a wagering game system.

FIG. 3 is a flow diagram ("flow") 300 illustrating operations for using a computer bot and a player's game history to play a multiplayer wagering game competition for a player in a wagering game system, according to some embodiments. The flow of 300 will be described with reference to the example system architecture of FIG. 2. The flow diagram begins at block 302.

At block 302, the online wagering game server 250 generates game history for each of a plurality of wagering games, associated with a first wagering game title, played by a first player in a wagering game system 200. The online wagering game server 250 can also generate game history for a plurality of games associated with various other wagering game titles previously played by the first player. The game history can include game events associated with games played by a player, e.g., button presses, bet inputs, bonus events, credit balances, random numbers, intermediate game results, final game results, etc., which can be used to reproduce and replay the games previously played by the player. In one implementation, the game history unit 255 of the online wagering game server 250 can detect game events associated with the plurality of games played by the first player, and then can generate and store the game history. In some embodiments, the online wagering game server 250 can use a subset of the player's game history and generate a computer bot to play for a player in a multiplayer wagering game competition, while the player is offline or otherwise unavailable, as will be further described below.

As illustrated in the example of FIG. 1, the game history unit 255 can generate the game history 110 associated with a player for the games played of a specific wagering game title, e.g., the spins of a Zeus slot game. In this example, the game history 110 may include game history entries for 500 spins (games) the player has played of the Zeus slot game. In another example, the game history unit 255 can generate game history associated with a player for the video poker games the player has played of a particular video poker game title. In this example, the game history may include game history entries for 1200 poker games the player has previously played of the video poker game title. It is noted that the game history unit 255 can generate and store game history for various other types of games played by each of the players, e.g., video roulette games, video blackjack games, video Texas hold'em games, mechanical/video slot games, etc. After block 302, the flow continues at block 304.

At block 304, the online wagering game server 250 identifies eligibility requirements for a multiplayer wagering game competition. In some embodiments, the multiplayer wagering game competition can be an multiplayer online tournament, such as an online slot tournament, an online poker tournament, an online roulette tournament, etc., a head-to-head challenge between two players, a team competition, or other types of multiplayer competitions. The eligibility requirements for a multiplayer wagering game competition, involving a particular wagering game title, can specify that a player must have previously played a minimum number of games of the wagering game title to be eligible to participate in the competition. It is noted that in some cases a multiplayer wagering game competition can have additional eligibility requirements, e.g., minimum bet per game requirements, income requirements, geographical requirements, etc.

In some implementation, the wagering game management unit 256 can determine the eligibility requirements for a multiplayer wagering game competition to determine whether the first player is eligible to participate in the competition. In one example, a player can select specific tournaments that the player wants to participate in while the player is unavailable. For example, the player can make the selections via a player preference menu provided by the wagering game management unit 256 on a browser of a gaming machine 260. The player may also specify that the player wants to participate in all tournaments that the player meets the eligibility requirements, all tournaments involving a specific wagering game type (e.g., all online video poker tournaments), or all tournaments involving a specific wagering game title (e.g., all Zeus slot tournaments). It is noted that the wagering game management unit 256 may also allow a player to specify various other player preferences via the browser on the gaming machine 260, e.g., whether the wagering game management unit 256 can select the first player when tournaments need additional players, whether the wagering game system should accept head-to-head challenges from other players while the first player is unavailable, etc. After block 304, the flow continues at block 306.

At block 306, the online wagering game server 250 determines that the first player meets the eligibility requirements for the multiplayer wagering game competition based, at least in part, on the first player's game history. In one example, the eligibility requirements for the multiplayer wagering game competition can specify that players must have played at least 400 games of the wagering game title that will be played during the competition, e.g., the Zeus slot game. In this example, the wagering game management unit 256 accesses the first player's game history in the game history unit 255 and determines that the first player is eligible for the competition since the player has played 500 games of the wagering game title. If the wagering game management unit 256 determines that the first player is not eligible, the wagering game management unit 256 may notify the first player, e.g., by posting a message in the player's wagering game account, sending an email message, sending a text message, etc. After block 306, the flow continues at block 308.

At block 308, the online wagering game server 250 determines the number of wagering games of the first wagering game title that are expected to be played by each player during the multiplayer wagering game competition. For example, if the multiplayer wagering game competition is a time-based competition, the wagering game management unit 256 can determine, on average, how many games of the first wagering game title a player can play during the specified amount of time allotted for the time-based competition. In another example, the wagering game management unit 256 can access information about the multiplayer wagering game competition, which specifies the number of games that will be played by each player. In other examples, one or more of the players can set the number of games that will be played during the competition, and the wagering game management unit 256 can determine the number of games to be played based on player input received at the online wagering game server 250. For example, when a player challenges another player to a head-to-head wagering game competition or when a player creates a multiplayer tournament, the player may be given the option to specify the number of games that will be placed during the competition. In one example, the wagering game management unit 256 may allow a player to specify the number of games as long as the number of games is within a desired range, i.e., above a minimum number of games and below a maximum number of games. It is noted, however, that in other implementations the wagering game management unit 256 can determine the expected number of games by other techniques, for example, based on historical information, i.e., how many games were played in the past during similar competitions. After block 308, the flow continues at block 310.

At block 310, the online wagering game server 250 randomly selects, from the game history, a subset of the plurality of wagering games previously played by the first player based on the number of wagering games expected to be played during the multiplayer wagering game competition. In one implementation, the wagering game management unit 256 randomly selects a subset of games from the first player's game history that is equal to the number of games expected to be played during the competition. In other implementations, the wagering game management unit 256 can randomly select a subset of games from the first player's game history that is equal to the number of games expected to be played during the competition plus a predetermined number of games or a predetermined percentage of the games. In these implementations, additional games can be selected in case the expected number of games is a low estimate. For example, if the expected number of games is 100 games, the wagering game management unit 256 can select an extra 20 games for a total of 120 games, or select an extra 30% for a total of 130 games.

In the example shown in FIG. 1, if 40 games (spins) are expected to be played during a Zeus slot multiplayer tournament, the wagering game management unit 256 can randomly select a block of spins from the game history 110, e.g., spins #168-208. In another example, the wagering game management unit 256 can randomly select any of the 500 spins in the game history 110 for a total of 40 spins, rather than selecting a block of spins from back-to-back game history entries. In some examples, the wagering game management unit 256 may select an extra 10 spins, for a total of 50 spins, in case the expected number of games for the Zeus slot multiplayer tournament (i.e., 40 games) was a low estimate. Similarly, for competitions involving other types of wagering games, e.g., a video poker tournament, the wagering game management unit 256 can randomly select a plurality of previously played games from the player's game history. After block 310, the flow continues at block 312.

Referring to FIG. 4, at block 312, the online wagering game server 250 generates, based on the randomly selected wagering games from the first player's game history, a computer bot for the first player to be used during the multiplayer wagering game competition to play for the first player. In one implementation, the wagering game management unit 256 generates a computer bot that is designed to replay the randomly selected subset of games from the first player's game history during the competition to play for the first player when the first player is offline or otherwise unavailable. For example, the wagering game management unit 256 may customize the computer bot to replay the randomly selected subset of games based on the game events stored in the first player's game history for the randomly selected subset of games. In some implementations, the wagering game management 256 can generate a computer bot that is designed to regenerate results that were previously generated when the randomly selected subset of games were originally played by the first player (e.g. based on game events stored in the first player's game history), and submit the regenerated results during the wagering game competition to play for the first player. It is noted that the wagering game management unit 256 may also generate additional computer bots to play for other players during the multiplayer wagering game competition based on the players' game history. Thus, in some embodiments, the computer bots can act as proxies for players who are unavailable. After block 312, the flow continues at block 314.

At block 314, the online wagering game server 250 initiates the multiplayer wagering game competition between a plurality of players including the computer bot for the first player. In one example, the wagering game management unit 256 can initiate the competition by allowing the player(s) that are playing live ("live players") and the computer bot(s) to begin playing games of the wagering game title. For a time-based competition, the wagering game management unit 256 can also start the timer for the competition. After block 314, the flow continues at block 316.

At block 316, the online wagering game server 250 replays the randomly selected subset of wagering games previously played by the first player using the computer bot during the multiplayer wagering game competition. In one implementation, the wagering game management unit 256 uses the computer bot to replay the randomly selected subset of games based on the game events stored in the first player's game history for the randomly selected subset of games previously while the player is unavailable. For example, the wagering game management unit 256 may use the computer bot to reproduce or replay button presses, bet inputs, random numbers, and other game events stored in the first player's game history for the randomly selected subset of games to replay the randomly selected subset of games during the competition. Thus, in some instances of the multiplayer wagering game competition, the first player's performance is based on randomly selected previous game results. This differs from live players, whose performance is based on results generated during the multiplayer wagering game competition.

In some examples, the multiplayer wagering game competition can comprise of one or more live players playing the wagering game title, and one or more computer bots playing the wagering game title for players based on their game history. In another example, the multiplayer wagering game competition can be a head-to-head competition initiated by a second player to challenge the first player. In this example, the competition may consist of the second player competing against a computer bot generated based on the first player's game history. In one example, the second player may challenge a computer bot of the first player to practice against the first player, or to attempt to overtake the first player in a leader board of the wagering game title. Similarly, in another example, the first player can challenge a second player to a head-to-head competition. In this example, the competition can comprise a computer bot for the first player competing against a computer bot for the second player. It is noted, however, that the online wagering game server 250 can use computer bots and game history for various other game examples and implementations, e.g., to implement professional bot tournaments (see FIGS. 5-6). After block 316, the flow continues at block 318.

At block 318, the online wagering game server 250 determines the results of the multiplayer wagering game competition. In some implementations, the wagering game management unit 256 can determine the overall competition results for the first player based on the results that are generated when the randomly selected subset of wagering games are replayed during the wagering game competition. The wagering game management unit 256 can also determine results for other computer bots based on the corresponding player's game history. The wagering game management unit 256 can generate the overall competition results for the live players that are playing "new" wagering games (i.e., they are not replaying wagering games from their game history) based on random numbers and other game events generated during the wagering game competition. In some implementations, if the computer bot for the first player performs well in the competition, the wagering game management unit 256 may award a percentage of the winnings to the first player. For example, the first player may be awarded 50% or 60% of what the first player would have won if the first player was playing rather than the computer bot. In some implementations, the wagering game management unit 256 may award all of the winnings to the first player. The wagering game management unit 256 may allow the first player to win the competition, including the entire award, based on the play of the computer bot. In some implementations, in head-to-head competitions, winning against a player's bot may be equivalent to winning against the player. For example, a player may move up in a leader board, or a player's win record may be improved, after winning against another player's computer bot. It is noted, however, that in other implementations the wagering game management unit 256 may determine results of the multiplayer wagering game competition, considering the performance of computer bots, by other methods and awarding rules. After block 318, the flow ends.

In some embodiments, the online wagering game server 250 may offer a player the option to display a control menu, or other type of graphical user interface, on the browser of the gaming machine 260, which can be used by the player to select game history replay preference. In one example, the online wagering game server 250 can display a visual representation of the player's game history, and the player can select (e.g., by clicking on checkboxes) which of the previously played games in the player's game history can be considered when randomly selecting games for a wagering game competition. For example, if the player has played 1000 games of a wagering game title, the player can select or enable 450 of the 1000 to be considered for wagering game competitions. In other words, in this example, when the online wagering game server 250 randomly selects games for a wagering game competition, the server 250 will just select games out of the 450 enabled games.

In other embodiments, the online wagering game server 250 may allow the player to make a copy of one or more games of the player's game history, and may allow the player to modify the copy of the one or more games to change how the player played the one or more games, without modifying the player's game history. The player may modify how the player played certain games to try to improve the outcomes of those games. For example, in a video poker game, if the player folded in a game based on a certain hand, the player may modify how the player played the game by staying in the game. In these embodiments, when the online wagering game server 250 randomly selects games from the player's game history, the server 250 randomly select games from the player's unmodified game history and also the player's modified copies of previously played games. For example, if game number 115 in a player's game history is unmodified and game number 215 has a modified copy of the game, when the online wagering game server 250 randomly selects game numbers 115 and 215, the online wagering game server 250 would select the original game 115 and the modified copy of the game 215 for the competition.

In some embodiments, rather than playing a plurality of games of a single wagering game title, some multiplayer wagering game competitions may consist of the players playing a plurality of games of a plurality of different wagering game titles. For example, a multiplayer wagering game competition may consist of the players playing 50 video poker games and 50 video slot games.

FIG. 5 is a flow diagram ("flow") 500 illustrating operations for using a computer bot and a professional wagering game player's game history to implement a professional bot tournament in a wagering game system, according to some embodiments. The flow of 500 will be described with reference to the example system architecture of FIG. 2. The flow diagram begins at block 502.

At block 502, the online wagering game server 250 generates game history for professional wagering game players. The game history for each of the professional players includes a plurality of wagering games, associated with a first wagering game title, previously played by the professional player. The game history for each player may also include a plurality of wagering games associated with various other wagering game titles previously played by professional player. As described above, the game history can include game events associated with games played by a player, e.g., button presses, bet inputs, bonus events, credit balances, random numbers, intermediate game results, final game results, etc., which can be used to reproduce and replay the previously played games. In some embodiments, for each of the professional players, the online wagering game server 250 can use a subset of the professional player's game history and generate a computer bot for the professional player, in order to host professional bot tournaments, as will be further described below. It is noted, however, that in other implementations the online wagering game server 250 can use the game history of other celebrity wagering game players, e.g., actors, musicians, professional athletes, etc., in order to host celebrity bot tournaments. After block 502, the flow continues at block 504.

At block 504, the online wagering game server 250 receives, from each of a plurality of players, a selection of a plurality of the professional wagering game players for a professional bot tournament. In one implementation, the wagering game management unit 256 can cause a plurality of gaming machines 260 to present a tournament setup page (e.g., via a browser) to the plurality of players that are interested in participating in the professional bot tournament. Each of the players selects or drafts a plurality of professional players to play for the players in the professional bot tournament. In one example, each player selects 3 professional players to play for the player in the professional bot tournament. After block 504, the flow continues at block 506.

At block 506, the online wagering game server 250 determines the number of wagering games of the first wagering game title that are expected to be played by each computer bot during the professional bot tournament. For example, the wagering game management unit 256 can determine the number of games that are expected to be played during the tournament by similar techniques as described above with reference to FIG. 3. After block 506, the flow continues at block 508.

At block 508, the online wagering game server 250 randomly selects, from the game history of the selected professional players, a subset of the plurality of wagering games previously played by each of the selected professional players to be used during the professional bot tournament. In one implementation, the wagering game management unit 256 randomly selects a specific number of the previously played games based on the expected number of games to be played during the professional bot tournament. After block 508, the flow continues at block 510.

Referring to FIG. 6, at block 510, the online wagering game server 250 generates a computer bot for each of the selected professional players, based on the randomly selected wagering games from each of the professional player's game history, to be used during the professional bot tournament. In one implementation, the wagering game management unit 256 generates a computer bot for each of the selected professional players that is designed to replay the randomly selected subset of games from the professional player's game history during the tournament. After block 510, the flow continues at block 512.

At block 512, the online wagering game server 250 initiates the professional bot tournament. For example, the wagering game management unit 256 launches the computer bots for the selected professional players to start the tournament. After block 512, the flow continues at block 514.

At block 514, the online wagering game server 250 replays the randomly selected wagering games previously played by each of the selected professional players using the computer bots during the professional bot tournament. For example, in a professional bot tournament of Texas hold'em, the wagering game management unit 256 replays the randomly selected Texas hold'em games previously played by each of the selected professional players using the computer bots. After block 514, the flow continues at block 516.

At block 516, the online wagering game server 250 determines the results of the professional bot tournament. For example, in a professional bot tournament, the wagering game management unit 256 may determine the top three finishing computer bots associated with three professional players. In this example, the wagering game management unit 256 may determine the players that selected the professional players associated with the top three finishing computer bot and may provide the awards to these players. In some implementations, a percentage of the winnings may be provided to the players that selected the professional players, and the remaining percentage may be provided to the professional players. For example, 70% of the winnings can be provided to the players that selected the professional players, and the remaining 30% can be provided to the professional players. After block 516, the flow ends.

It is noted that the casino wagering game server 282 of the casino network 280 can implement the operations described above with reference to FIGS. 3-6 based on player preference information and other configuration information provided by players, e.g., via a casino wagering game machine 260, to allow casino players to participate in multiplayer wagering game competitions while the players are away from the casino, or otherwise unavailable.

Additional Example Operating Environments

This section describes example operating environments, systems and networks, and presents structural aspects of some embodiments.

Wagering Game Machine Architecture

Figure 7:
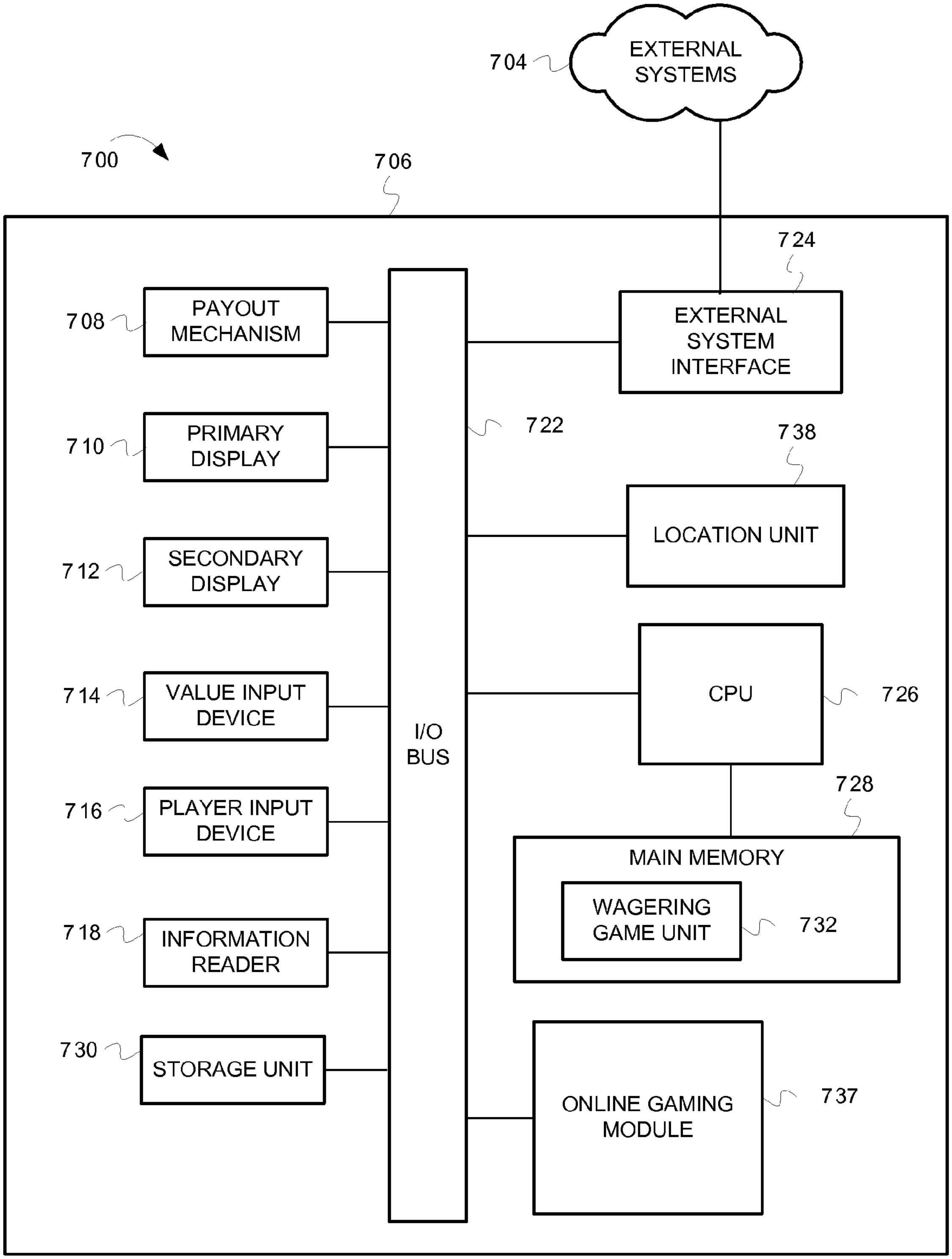
FIG. 7 is a conceptual diagram that illustrates an example of a wagering game machine architecture, according to some embodiments.

FIG. 7 is a conceptual diagram that illustrates an example of a wagering game machine architecture 700, according to some embodiments. In FIG. 7, the wagering game machine architecture 700 includes a wagering game machine 706, which includes a central processing unit (CPU) 726 connected to main memory 728. The CPU 726 can include any suitable processor, such as an Intel® Pentium processor, Intel® Core 2 Duo processor, AMD Opteron™ processor, or UltraSPARC processor. The main memory 728 includes a wagering game unit 732. In some embodiments, the wagering game unit 732 can present wagering games, such as video poker, video black jack, video slots, video lottery, reel slots, etc., in whole or part. The wagering game unit 732 may also use a computer bot and randomly selected game history to play multiplayer wagering game competitions for the player while the player is unavailable, e.g., as described above with reference to FIGS. 1-6.

The CPU 726 is also connected to an input/output ("I/O") bus 722, which can include any suitable bus technologies, such as an AGTL+ frontside bus and a PCI backside bus. The I/O bus 722 is connected to a payout mechanism 708, primary display 710, secondary display 712, value input device 714, player input device 716, information reader 718, and storage unit 730. The player input device 716 can include the value input device 714 to the extent the player input device 716 is used to place wagers. The I/O bus 722 is also connected to an external system interface 724, which is connected to external systems 704 (e.g., wagering game networks). The external system interface 724 can include logic for exchanging information over wired and wireless networks (e.g., 802.11g transceiver, Bluetooth transceiver, Ethernet transceiver, etc.)

The I/O bus 722 is also connected to a location unit 738. The location unit 738 can create player information that indicates the wagering game machine's location/movements in a casino. In some embodiments, the location unit 738 includes a global positioning system (GPS) receiver that can determine the wagering game machine's location using GPS satellites. In other embodiments, the location unit 738 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 7, in some embodiments, the location unit 738 is not connected to the I/O bus 722.

In some embodiments, the wagering game machine 706 can include additional peripheral devices and/or more than one of each component shown in FIG. 7. For example, in some embodiments, the wagering game machine 706 can include multiple external system interfaces 724 and/or multiple CPUs 726. In some embodiments, any of the components can be integrated or subdivided.

In some embodiments, the wagering game machine 706 includes an online gaming module 737. The online gaming module 737 can process communications, commands, or other information, where the processing can control and present online wagering games. In some embodiments, the online gaming module 737 can work in concert with the wagering game unit 732, and can perform any of the operations described above.

Furthermore, any component of the wagering game machine 706 can include hardware, firmware, and/or machine-readable media including instructions for performing the operations described herein.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method comprising:

generating, via one or more processors, game history for each of a plurality of wagering games played by a first player via a wagering game system;

randomly selecting, from the game history, a game history subset from the plurality of wagering games;

generating, via at least one of the one or more processors, a computer bot to be used during a multiplayer wagering game competition to play for the first player;

initiating, via the wagering game system, the multiplayer wagering game competition including a plurality of players and the computer bot playing for the first player;

determining, by the computer bot during the multiplayer wagering game competition, input for the first player based on the game history;

receiving, during the multiplayer wagering game competition, input for the plurality of players;

determining results of the multiplayer wagering game competition based on the input for the first player and the input for the plurality of players.

2. The method of claim 1, further comprising determining a number of wagering games that are expected to be played during the multiplayer wagering game competition.

3. The method of claim 1, further comprising identifying eligibility requirements for the multiplayer wagering game competition, and determining that the first player meets the eligibility requirements.

4. The method of claim 3, wherein the eligibility requirements require the first player to have played at least a minimum number of wagering games of a given title.

5. The method of claim 1, wherein the input for the first player is based on game events included in the game history subset.

6. The method of claim 1, further comprises determining, based on the results of the multiplayer wagering game competition, that the first player has won an award, and providing at least a portion of the award to a player account associated with the first player.

7. The method of claim 1, wherein the wagering game system comprises an online wagering game system.

8. The method of claim 1, wherein the wagering game system comprises a casino floor wagering game system.

9. The method of claim 1, wherein the plurality of wagering games include at least one of a blackjack game, a poker game, a roulette game, and a Texas hold'em game.

10. The method of claim 1, wherein said generating game history for each of the plurality of wagering games comprises:

detecting game events associated with each of the plurality of wagering games; and storing the game events.

11. The method of claim 1 further comprising:

receiving input, from the first player via a wagering machine, specifying ones of the plurality of wagering games to consider when randomly selecting the game history subset.

12. A wagering game server comprising:

a game history unit configured to generate game history for each of a plurality of wagering games, wherein the wagering games are of a first wagering game title and played by a player account in a wagering game system;

a wagering game management unit configured to randomly select a game history subset from the game history, and configured to:

generate a computer bot for the player account, wherein the computer bot to be used to generate input on behalf of the player account during a multiplayer wagering game competition;

initiate the multiplayer wagering game competition including the computer bot participating for the player account and one or more additional player accounts;

provide by the computer bot during the multiplayer wagering game competition, input for the player account based on the game history subset;

determine input for the other player accounts;

determine results for the multiplayer wagering game competition based on the input for the player account and the input for the other player accounts.

13. The wagering game server of claim 12, wherein the wagering game management unit is further configured to:

determine a number of wagering games of the first wagering game title that are expected to be played during the multiplayer wagering game competition; and randomly select the game history subset based on the number of wagering games that are expected to be played during the multiplayer wagering game competition.

14. A computer-implemented method comprising:

generating, via one or more processors, game history for each of a plurality of wagering games played by each of a plurality of professional players via a wagering game system;

receiving, from a gaming machine over a network, a selection of one of the plurality of professional players;

randomly selecting, from the game history associated with the selected one of the plurality of professional players, a game history subset including events from the plurality of wagering games played by the selected one of the professional players;

generating a first computer bot configured to mimic the selected professional player, wherein behavior of the computer bot is based on the game history subset, and wherein the computer bot is to be used in a professional bot wagering game competition;

initiating, via the wagering game system, the professional bot wagering game competition between a plurality of players including the first computer bot playing for a first player account and one or more other computer bots playing for one or more other player accounts;

replaying, by the first computer bot, events from the game history subset on behalf of the first player account during the professional bot wagering game competition; and determining results of the professional bot wagering game competition.

15. The method of claim 14, wherein said determining results of the professional bot wagering game competition comprises determining that the first computer bot has won an award for the first player account, and providing a portion of the award to the first player account and providing a remaining portion of the award to a player account associated with the selected one of the plurality of professional players.

16. One or more non-transitory machine-readable storage media, having instructions stored therein, which when executed by one or more processors causes the one or more processors to perform operations comprising:

generating game history for each of a plurality of wagering games played by a first player via a wagering game system;

randomly selecting, from the game history, a game history subset from the plurality of wagering games;

generating a computer bot to be used during a multiplayer wagering game competition to play for the first player;

initiating, via the wagering game system, the multiplayer wagering game competition including a plurality of players and the computer bot playing for the first player;

determining, by the computer bot during the multiplayer wagering game competition, input for the first player based on the game history;

receiving, during the multiplayer wagering game competition, input for the plurality of players;

determining results of the multiplayer wagering game competition based on the input for the first player and the input for the plurality of players.

17. The machine-readable storage media of claim 16, wherein said generating game history for each of the plurality of wagering games comprises:

detecting game events associated with each of the plurality of wagering games; and storing the game events.

* * * * *